United States Patent
Barry

(10) Patent No.: US 10,184,445 B2
(45) Date of Patent: Jan. 22, 2019

(54) LINEAR ARRAY OF WAVE ENERGY CONVERSION DEVICES

(71) Applicant: Christopher David Barry, Edgewater Beach, MD (US)

(72) Inventor: Christopher David Barry, Edgewater Beach, MD (US)

( * ) Notice: Subject to any disclaimer, the term of this patent is extended or adjusted under 35 U.S.C. 154(b) by 5 days.

(21) Appl. No.: 15/199,823

(22) Filed: Jun. 30, 2016

(65) Prior Publication Data

US 2018/0003147 A1    Jan. 4, 2018

Related U.S. Application Data

(60) Provisional application No. 62/187,225, filed on Jun. 30, 2015.

(51) Int. Cl.
*F03B 13/20* (2006.01)
*F03B 15/00* (2006.01)

(52) U.S. Cl.
CPC .............. *F03B 13/20* (2013.01); *F03B 15/00* (2013.01); *F05B 2220/706* (2013.01); *F05B 2240/40* (2013.01); *F05B 2240/93* (2013.01); *Y02E 10/38* (2013.01)

(58) Field of Classification Search
CPC ...... F03B 13/20; F03B 15/00; F05B 2240/93; F05B 2220/706; Y02E 10/38
See application file for complete search history.

(56) References Cited

U.S. PATENT DOCUMENTS

| | | | |
|---|---|---|---|
| 3,928,967 A | 12/1975 | Salter | |
| 4,048,512 A | 9/1977 | Wood | |
| 4,077,213 A * | 3/1978 | Hagen | F03B 13/20 417/331 |
| 4,098,084 A * | 7/1978 | Cockerell | F03B 13/20 417/332 |
| 4,210,821 A * | 7/1980 | Cockerell | F03B 13/20 290/53 |
| 4,288,986 A | 9/1981 | Watson | |
| 4,313,716 A * | 2/1982 | Jones | F03B 13/20 417/331 |
| 4,392,349 A * | 7/1983 | Hagen | F03B 13/20 60/500 |

(Continued)

OTHER PUBLICATIONS

Christopher Barry, Salter-McCloskey Wave Energy Conversion System, Jul. 1, 2014, Tech Briefs Create the Future, 1-2 (Year: 2014).*

*Primary Examiner* — Michael C Zarroli

(57) ABSTRACT

The invention relates to the extraction of energy from waves and comprises a linear array of several Salter's Ducks set roughly perpendicular to the oncoming wave crest. The Ducks are each rotatably connected through a power take-off device to a rigid space frame. The Ducks are spaced and designed to have an optimized natural frequency of each Duck and the array and space frame as a whole and the response characteristics of each Duck may be further modified by controls on the power take-off in response to signals from the whole array of Ducks, particular the lead Duck, but possibly also each other Duck and the space frame motion as a whole. The whole space frame and Duck array can be moored by any means appropriate, but most likely to a single point catenary moor, though other mooring systems are possible.

5 Claims, 2 Drawing Sheets

Close Up of the First Duck

(56) References Cited

U.S. PATENT DOCUMENTS 4,781,023 A * 11/1988 Gordon .................. F03B 13/20
290/42
2016/0305395 A1* 10/2016 Larsen ................ F03B 13/1815

* cited by examiner

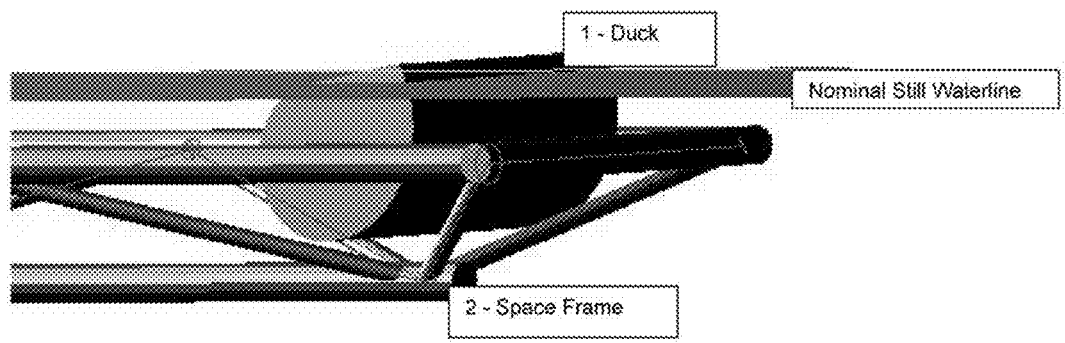
Figure 1 – Close Up of the First Duck
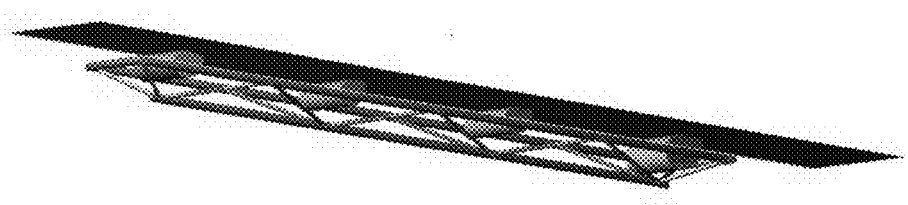
Figure 2 – The Entire Space Frame and All Four Ducks

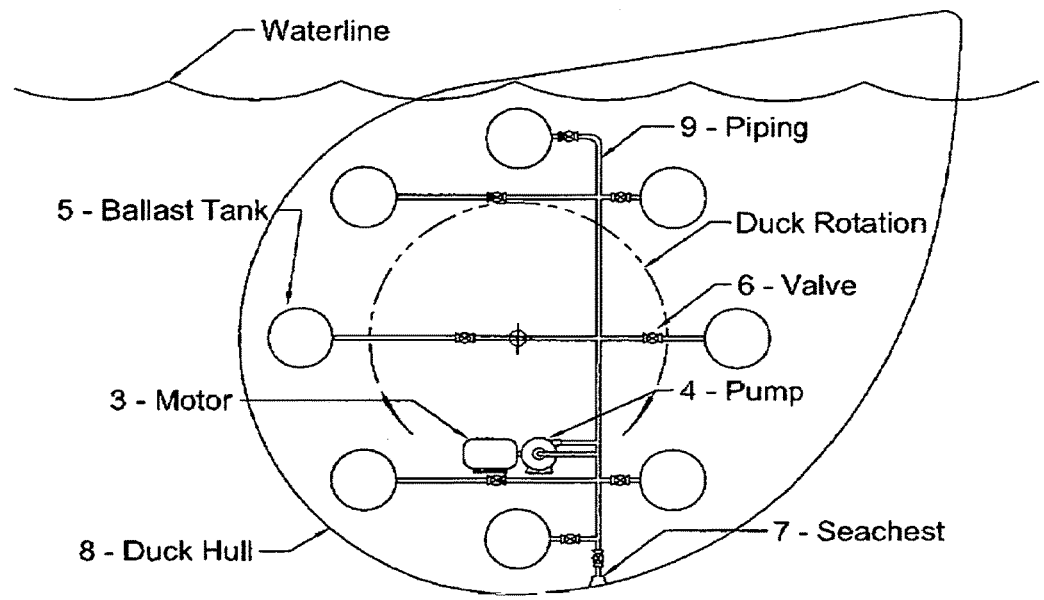
Figure 3 – Water Ballast System
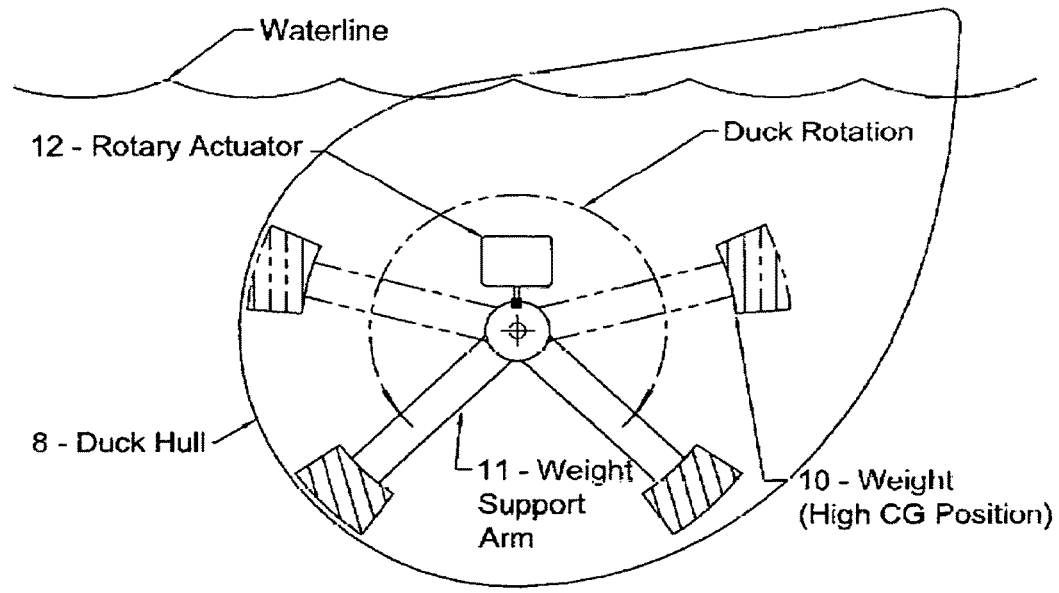
Figure 4 – Movable Weight System

LINEAR ARRAY OF WAVE ENERGY CONVERSION DEVICES

CROSS REFERENCE TO RELATED APPLICATIONS

This application claims the benefit of provisional patent application Ser. No. 62/187,225, filed 2015 Jun. 30 by the present inventor.

FEDERALLY SPONSORED RESEARCH

None

SEQUENCE OR PROGRAM LISTING

None

TECHNICAL FIELD

The present invention relates to marine hydrokinetic energy conversion, and more specifically conversion of the energy of ocean waves by means of the motion of objects floating in the water, excited by said waves.

SPECIFICATION

The conversion of ocean wave energy to useful power has been a long sought goal of many inventors as taught by McCormick. Prior art in wave energy conversion has typically comprised a body that is excited by the wave and moves, connected to a mechanism that converts the motion of the excited body into power, and some means of providing a relatively fixed point that the anchors the other end of the conversion mechanism such that there is relative motion between the excited body and the conversion mechanism.

The energy in ocean waves is contained in the orbital motion of water particles as the wave form moves. As a wave passes, the water moves backwards (with respect to the direction of motion of the wave) and down into the oncoming trough, then up and forwards into the crest, and then down into the next trough. This energy can be separated into two parts, a vertical component and a horizontal component so that at any fixed point, over time half the wave energy is horizontal motion and half vertical. Wave energy devices generally capture one of the two components. For example, a buoyant body can be constrained to heave (move vertically) with the vertical part of the wave energy; as the wave crest rises around the body, its buoyancy causes it to rise as well. Then it will fall in the following wave trough. This motion can be captured by various devices and converted to other forms of energy, but it only comprises half the available energy in the wave.

Though there is a substantial body of prior art in wave energy conversion the challenge has principally been economic rather than technical (Akers et al). The economics of any energy device is the ratio of total cost of the device (including maintenance, fuel and other ongoing costs) to the value of the energy produced. Ocean waves are large, so that the devices will also be large. This suggests that one proxy for cost is the total mass of the device; the more massive, the more it will inevitably cost to build, and likely maintain. In addition the mass of the device will control other cost drivers such as mooring loads. This in turn suggests that energy absorbed per unit mass is an appropriate measure of cost effectiveness. A second issue is adequate strength to survive heavy weather which also adds cost. Numerous experimental devices have been destroyed by powerful waves in storms.

To put it simply, wave energy conversion devices are typically too expensive for the power they produce.

This is due to four main issues:

First, a wave energy device needs a reference to "push against". Wave energy is contained in the movement of the water that makes up the wave, and the energy is in the difference in motion between the water and a point that does not move with the water in the particular portion of the wave that is being tapped for energy.

Second, waves have highly variable frequency and amplitude whereas most wave energy capture devices have a particular natural frequency of motion at which wave energy is most efficiently captured.

Third, the mechanism that translates the capture device into useful power of some kind must necessarily restrain the device to some extent in order to capture energy. This restraint affects the natural frequency and other responses of the excited body and potentially reduces the energy extracted. Simply put, if the power takeoff mechanism restrains the moving body too much in small waves, it doesn't move at all and no energy is extracted. If it doesn't restrain the moving body enough in large waves, the excited body moves too readily and little energy is extracted. This implies that the restraint system, which is also by definition the means of power extraction needs to be controlled based on the wave being experienced by the device. This phenomenon is similar to impedance matching in electronic circuits.

Fourth, the motion of water particles comprising a wave is essentially a large ellipse: as a wave passes, beginning in the trough, the water particles are moving in the opposite direction of the wave travel; as the crest approaches, the particles transition from horizontal to upward motion, then on the back of the crest they move downward and forward in the direction of the wave. This means half of the wave energy, through the whole cycle of a wave is in vertical motion and half is in horizontal motion.

This can be better understood by looking at extant prior art. The iconic device is best described as a "yo-yo" device; a buoyant body is connected to a cable to a device on the bottom of the ocean. As a wave goes by the buoyant body rises, pulling on the cable. The extension of the cable from the device activates some mechanism, such as a reel rotating a generator, which extracts power. A more sophisticated device is the "donut on a stick". In this case, a pile is fixed on the bottom and a buoyant body surrounds it. Passing waves cause the buoyant body to rise and fall and its motion relative to the pile is extracted by various devices such as linear electric generators, hydraulic or pneumatic cylinders or many other systems.

Another family of devices capture the horizontal component, such as a movable flap. The horizontal component causes the flap to oscillate back and forth in the direction of wave travel, and again this motion can be captured and converted to other forms of energy.

Another family of devices fixes an open topped column of some kind in the water and the rise and fall of waves causes air to pass in and out of the column through a turbine. A variant on this device uses strategies of hydrodynamics such as ramps to amplify the rise of wave such that they overtop a column with a closed bottom resulting in a differential height of water between the inside and outside of the column, and the resulting outflow is captured by a water turbine.

Another basic family of devices uses the change in water pressure beneath a wave to activate a flexible element fixed on the bottom.

The economic problem of all of these devices is that they must be foundationed to the bottom, and such structures are expensive, especially in deep water, a common rule of thumb from the offshore oil industry is that the steel in a structure increases as the cube of water depth. Since waves are attenuated by shallow water, it is also clear that shallow water wave installations will not be as effective as deep water ones, and that deep water installations will be expensive.

In response to this quandary, further prior art has taught that the natural frequency of a body floating in the water is related to its mass and its waterplane; the portion of the body that passes through the air-water interface. The waterplane is the part acted on by waves as they rise and fall and the mass resists motion induced by the forces from the waterplane through its inertia. The resulting natural frequency of motion of the body is the square root of the ratio of waterplane properties to mass. In the simple case of heave motion, the property in question is the area of the waterplane. The vertical force produced by motion of the body relative to a wave is the product of the area times the density of water, and this corresponds to the spring rate of a damped mass-spring system.

Hence some prior art has taught very large bodies that react the forces of a much smaller moving component. The difference in natural frequencies of the two components means that their relative motion will be substantial and will allow a reasonable amount of energy to be extracted. In the case of a "donut on a stick" device, rather than a pile affixed to the ocean bottom, a deep floating spar buoy with a well-submerged large volume is provided. The low frequency of the spar due to its small waterplane area and large mass means that it will be nearly motionless in most waves. Air turbine type devices have columns mounted on large barges, possibly with substantial fully submerged volumes. These devices can be used in deep water if desired, with a conventional single point or multi-legged flexible catenary cable mooring system. The problem with this type of device is that the large buoyant body is expensive and the amount of total system mass per energy produced is limited. In addition, it can produce large forces in heavy weather, particularly on its mooring system. For example, Wood teaches a linear array of moving bodies between two floating hulls, but this has substantial non-moving "dead" mass (the hulls) which has to be purchased, maintained, moored and protected in storms.

Other prior art has taught that the motion of water particles is different in different parts of the wave so that extended buoyant bodies will experience different water particle motions by virtue of being in different portions of the wave train. This prior art therefore comprises a string of barges of various shapes (Cockerill U.S. Pat. No. 4,098, 084), conventional rectangular blocks, tubes, etc. connected by hinges. The motion of the hinges provides a point of differential movement and hence a place to take off energy. This eliminates the dead large reference body but problem of this approach is that the devices themselves must be very massive and hence expensive. In addition, the motion they experience is only extracting energy from the differential slope of the wave, not most of the vertical motion of the water particles nor any of their horizontal motion so the amount of energy captured per device volume (and hence cost) is reduced. These devices are also subject to overloading in severe waves and some such devices have failed when the hinges were overloaded.

A final prior art approach to wave energy extraction is sloshing devices. These devices comprise a floating body whose motions in waves excite internal mechanisms such as a flume partly filled with water, or loose masses that slide or rotate. Energy is extracted by a turbine in the flume or rotational energy extraction devices on the loose mass. These devices depend on a large differential natural frequency between the floating body and the internal system such that they are out of phase. They also mainly extract energy only from the wave slope vice the actual particle motions and often need to have large mass so once again energy per mass is limited.

The problem of frequency matching is not well addressed by the prior art except as discussed below by varying energy extraction and restraint/reaction. Changing the natural frequency of a buoyant body requires changing the waterplane, the mass, or in the case of bodies that pitch or roll vice purely heaving, the center of gravity relative to the center of buoyancy. This is especially important because of a surprising phenomena; a body oscillating in waves naturally produces waves of its own. When the frequency of oscillation of the wave and the body are similar, the (generally circular) waves radiated by the body interact with those (generally linear) of the encountered wave system such that the encountered waves focus on the device, so that the device is hydrodynamically wider than it really is. This is called capture ratio, and increases the nominal efficiency of the device by a factor of as much as two, so that the effective efficiency of a device (based on its real width across a wave crest) can be as much as 160% so that the amount of energy captured per device mass is increased.

The problem of varying the restraint/reaction is addressed by varying the back force of the energy extraction system. In the case of an electrical generator, the field strength of the stator can be changed by changing its excitation. Pneumatic or hydraulic systems can change the pump back pressure, fluid linkage (i.e. pumps in parallel or series, as taught by well established prior art in hydraulics). However, in order to exercise this control, oncoming waves have to be sensed rapidly in order to adjust the extraction system parameters.

Most devices use either the vertical motion of the wave or the wave slope for an energy source; few capture both the vertical and horizontal motion. However, Salter teaches that a cam shaped cylinder, referred to as a "nodding Duck" captures both. The Duck is excited in a pitching motion by the vertical and horizontal water particle motion on its submerged front ("paunch") and is reacted by a relatively fixed shaft at its axis of rotation. This doubles the amount of energy captured per unit mass, and it is Salter's Ducks that produce the high efficiency (capture ratio) discussed above. However, all prior art involving Salter's Ducks has used bottom fixed multi-point moorings, rigid bottom fixed structures or various large reference masses. Salter teaches an array of Ducks roughly parallel to oncoming wave crests on a flexible spine. Wood (U.S. Pat. No. 4,048,512) teaches an array of Ducks connected to a single point by a series of taut cables and to each other by a spine. It is not clear that either prior art device is intended to provide a reference point for reacting device movement, and it will not reliably do so because it is likely that the Ducks will be in phase or close to in phase across a wave crest much of the time, so this is not an effective strategy to provide reaction for energy extraction.

Finally, the device needs to be robust in heavy weather. Though such devices can be made stronger, a complementary way of doing this is to minimize the volume of the device above water; its reserve buoyancy. High waves produce large forces on all of the exposed volume of a device, so if it has minimal reserve buoyancy the additional forces produced in large waves will be minimal as well and the device will not need to sustain such large occasional forces due to heavy weather.

The particular circumstances of a given wave environment will vary widely by wave height and typical period, water depth, distance from shore and many other variables. This means that some prior art approaches may be useful, but they do not necessarily fully address all environments economically, particularly those with relatively large waves, and relatively deep water, such as most of the West Coast of the U.S. and Canada, which also happen to be rich in terms of wave energy resources.

The devices in the prior art therefore might work in some specific environments, but will probably not be cost effective, particularly in those with the best resources. An effective general purpose wave energy conversion device must:
- Have a small non-moving mass and not need to be rigidly connected to the bottom.
- Have means to efficiently accept wave systems with a wide range of natural frequencies.
- Have means to robustly sense incoming waves and adjust power takeoff reaction as needed.
- Have minimal above water volume.
- Capture both horizontal and vertical wave energy.

SUMMARY

McCloskey teaches that waterfowl such as ducks are commonly found in a linear array perpendicular to the line of travel with a lead duck in control. This inspires the first embodiment of the invention. In the first embodiment, four Salter's Ducks are aligned mainly perpendicular to the oncoming wave crest by means such as a single point catenary mooring, though it will be understood that there have to be at least two Ducks, but the actual number chosen will vary according to the local physical and economic environment. The Ducks are attached to a rigid space frame with a reasonable amount of distance between each Duck and capture both horizontal and vertical wave energy by the reaction of their rotation against the space frame, which is provided with an energy extraction device internal to the Duck. The energy extraction device is also controlled as to reaction impedance (which also can have a small effect on the natural frequency as well) by the motion of the first (lead) Duck.

ADVANTAGES

As a result, the reference bodies for any one Duck are the other Ducks (which are in a different part of the wave) and little non-moving mass is required; from the "viewpoint" of one Duck, the others are motionless in the wave even though they are rotating; due to the separation, the rotational motion of any one Duck is de minimus in terms of the motion of the frame. This means that the dead mass used to provide a reaction point for wave forces is minimal and the ratio of dead mass to active (excited by waves) mass is small and hence the cost of the dead mass compared to the power generated by the system is also minimal.

The energy extracted from the rotation of the Duck can be transformed by electrical, pneumatic, or hydraulic means with reaction impedance matching. However in this case the motion of the first Duck, as the wave crest approaches the system, produces a very large signal characterizing the height and frequency of the wave that can be sent to the following Ducks to adjust their reaction impedance. For example, in an electrical system the motion of the first Duck could be used to generate the stator fields for the following Ducks.

Each Duck can also be designed with a different location of its center of gravity by means such as fixed or even movable liquid ballast so that though one Duck may not be a good frequency match to a given wave, one of the several Ducks will be. It is also important to note that the entire space frame Duck system itself will have a natural frequency, much lower than any given Duck, so in particularly long, low frequency waves the whole frame will be pitching and hence the Ducks will be excited by what they will "see" as very high waves.

Because Salter's Ducks are generally 80% to 90% under water the additional wave loads in very severe waves is also minimal. For example if the whole frame should span a large wave in the ship-like "sagging" condition, the first and last Ducks (at the wave crests) will be well submerged and the Ducks in the middle will also be mostly submerged, so the bending moment in the space frame will be minimized.

DRAWINGS

FIG. 1 shows a close-up of a triangular truss-like space frame with the lead "Pathfinder" Duck. In this case it is the largest and has the lowest natural frequency. Part 1 refers to any one of the Ducks in the system. Part 2 refers to the space frame connecting the Ducks.

FIG. 2 shows the entire space frame and all four Ducks (from beneath and aft).

The nominal still water level is shown in both figures.

FIG. 3 is a cross section of a water ballast system comprising numerous tanks (part 5) interconnected by a system of piping (part 9) and valves (part 6) and connected to the ocean water by a seachest (part 7). The tanks are filled and emptied, and water is transferred from one to the other by a pump (part 4) operated by a motor (part 3) as directed by the valves to modify the center of gravity as required to optimize its response to waves.

FIG. 4 is a cross section of a solid ballast weight system comprising two support arms (part 11) with weights on their ends (part 10). The support arms are rotated in opposite and equal directions by a hydraulic, pneumatic or electric rotary actuator (part 12). When the arms are in the low position, the center of gravity of the Duck is in its lowest position and as they are rotated the center of gravity is raised in proportion to the ratio of the weight of the Duck compared to the movable weights.

DETAILED DESCRIPTION; FIRST EMBODIMENT

The first embodiment comprises multiple Ducks (Part 1, four each in this case) captured within a truss type space frame, rotatably connected to the side elements of the space frame (Part 2) with an energy take off device within the Ducks actuated by the rotation of the Duck. The energy take off device can be a rotary or linear electrical generator, hydraulic or pneumatic pumps, mechanical means such as gears connecting to a flywheel (which subsequently can be further connected to energy transformation means), or other devices, whose design is within the ordinary skill of a practitioner of marine engineering.

ALTERNATIVE EMBODIMENTS

It will be understood that there can be more or less than four Ducks and there could be multiple columns of Ducks. Many variants of trusses, space frames or other elongated rigid bodies are also possible and may be preferred in a specific application. Such embodiment might comprise two columns of Ducks on either side of a tube. It will also be understood that other asymmetric cam shaped objects may be used instead of the particular shape taught by Salter. It will also be understood that the natural frequency or other characteristics of the Ducks can be modified according to such variables as the weather by moving fixed or liquid ballast within the Duck.

I claim:

1. An apparatus for converting the energy of waves in water to other useful forms comprising a multiplicity of floating ovoid bodies with an axis of rotation horizontal and approximately parallel to the crest of an oncoming wave, said bodies being configured with an asymmetric shape with a smaller end up wave about said axis of rotation so as to cause said ovoid bodies to rotate in an oscillatory fashion about said axes of rotation when excited by said wave, said ovoid bodies being arrayed in columns approximately parallel to the direction of travel of the wave, said ovoid bodies being spaced apart longitudinally by several lengths of said bodies, said ovoid bodies being rotatably attached to an elongated rigid structure that fixes said axes of rotation of said ovoid bodies in position relative to each other while allowing said ovoid bodies to rotate, said rotatable attachment being equipped with electrical, hydraulic, pneumatic or mechanical apparatus to convert said oscillatory rotation of said bodies to other forms of energy, and said elongated structure floating horizontally near the surface of the water, supported by said bodies.

2. The apparatus of claim 1 where the bodies have a cross section of Salter's Duck.

3. The apparatus of claim 1 wherein said ovoid bodies up wave of the subject ovoid bodies generate a control signal that modifies the action of said energy conversion apparatus to maximize energy extraction by varying the relationship between the resisting moment generated by the energy conversion apparatus reacting said rotation of said ovoid bodies thereby modifying the speed and magnitude of said ovoid body motion.

4. The apparatus of claim 1 wherein said ovoid bodies can have their weight and center of gravity modified at will as driven by control signals generated by the motion of other said ovoid bodies up wave of the following ovoid bodies by shifting internal solid ballast.

5. The apparatus of claim 1 wherein the ovoid bodies can have their weight and center of gravity modified at will based on control signals generated by said ovoid bodies up wave of the following ovoid bodies by taking on, discharging or shifting internal liquid ballast.

* * * * *